(12) United States Patent
Nakanishi et al.

(10) Patent No.: US 11,371,935 B2
(45) Date of Patent: Jun. 28, 2022

(54) POLYMER RESIN ORIENTATION EVALUATION METHOD

(71) Applicant: HAMAMATSU PHOTONICS K.K., Hamamatsu (JP)

(72) Inventors: Atsushi Nakanishi, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/916,402

(22) Filed: Jun. 30, 2020

(65) Prior Publication Data
US 2021/0010934 A1 Jan. 14, 2021

(30) Foreign Application Priority Data

Jul. 12, 2019 (JP) .............................. JP2019-130046

(51) Int. Cl.
*G01N 21/55* (2014.01)
*G01N 21/3581* (2014.01)

(52) U.S. Cl.
CPC ......... *G01N 21/55* (2013.01); *G01N 21/3581* (2013.01); *G01N 2021/558* (2013.01); *G01N 2201/06113* (2013.01)

(58) Field of Classification Search
CPC ........ G02F 1/365; G02F 1/3534; G02F 1/353; G02F 1/3551; G02F 2203/13; G01N 21/3581; G01N 21/3586; G01N 21/3577; G01N 21/35; G01J 3/10; G01J 3/42; G01J 3/108; G01J 3/447; G01J 3/0224; G02B 6/4296

USPC ................. 356/51, 364–369, 317, 326, 451; 250/341.8, 338.1, 341.3, 339.08, 339.07
See application file for complete search history.

(56) References Cited

U.S. PATENT DOCUMENTS

| 7,808,636 | B2* | 10/2010 | Schulkin | ................... | G01J 4/00 356/365 |
| 2009/0101297 | A1* | 4/2009 | Jez | ....................... | G01N 33/346 162/198 |
| 2017/0370833 | A1* | 12/2017 | Markelz | ................. | G01N 21/03 |

OTHER PUBLICATIONS

Stanley Rendon et al., "Effect of complex flow kinematics on the molecular orientation distribution in injection molding of liquid crystalline copolyesters", Polymer, Jul. 12, 2004, vol. 45, Issue15, p. 5341-p. 5352.
Makoto Okano & Shinichi Watanabe, "Anisotropic optical response of optically opaque elastomers with conductive fillers as revealed by terahertz polarization spectroscopy", Scientific Reports, Dec. 23, 2016,vol. 6,39079, p. 1-p. 11.

* cited by examiner

*Primary Examiner* — Hoa Q Pham
(74) *Attorney, Agent, or Firm* — Faegre Drinker Biddle & Reath LLP

(57) ABSTRACT

Provided is a polymer resin orientation evaluation method including: setting an axis intersecting a front surface of an object to be inspected as an inspection axis, and acquiring an optical characteristic value of the object to be inspected with respect to a plurality of polarization directions of a terahertz wave around the inspection axis; and evaluating orientation of a polymer resin that constitutes the object to be inspected on the basis of a variation amount of the optical characteristic value with respect to change of the polarization direction.

6 Claims, 9 Drawing Sheets

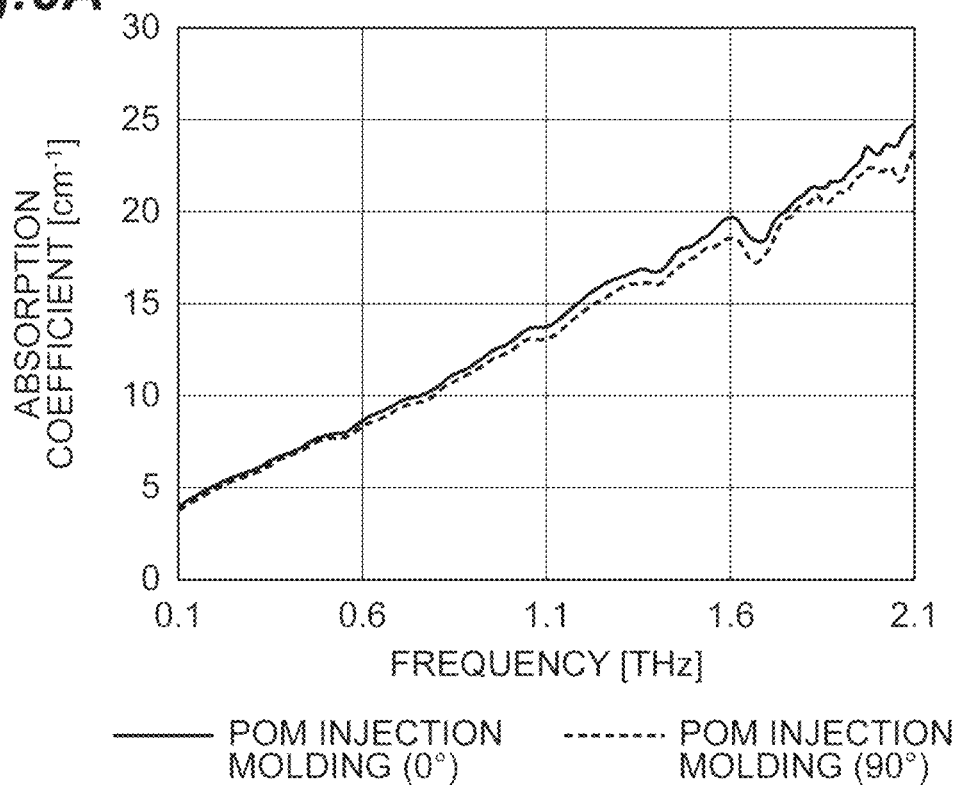
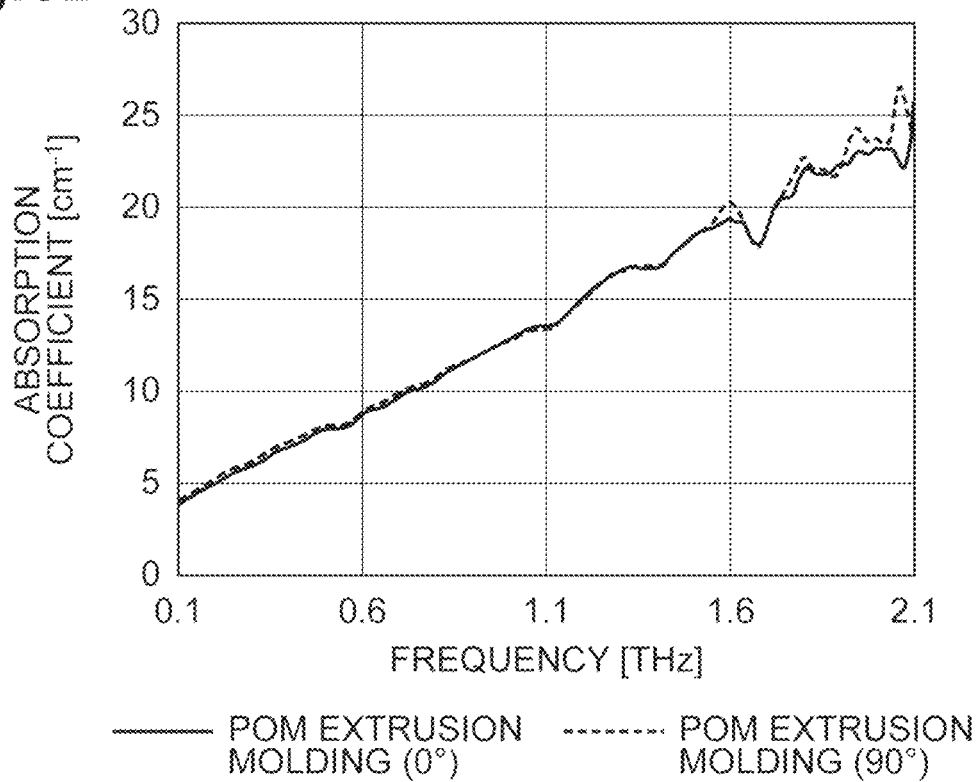

POLYMER RESIN ORIENTATION EVALUATION METHOD

TECHNICAL FIELD

The present disclosure relates to a polymer resin orientation evaluation method.

BACKGROUND

Resin products using a polymer resin are widely produced for industrial use. In the related art, strength evaluation of the resin products has been performed mainly by destructive inspection. As the destructive inspection, a tensile test in which an object to be inspected is pulled in a constant direction and a force at the time of being fractured is evaluated is typical. The inspection may be performed with respect to a simple shape such as a plate shape, but many resin products have a complicated shape, and it is difficult to perform evaluation with accuracy. In addition, it is impossible to apply the destructive inspection to all products.

As a nondestructive inspection with respect to resin products, for example, methods described in Non-Patent Literatures 1 and 2 are disclosed. Non-Patent Literature 1 is "Effect of complex flow kinematics on the molecular orientation distribution in injection molding of liquid crystalline copolyesters" polymer 45 5341 (2004). Non-Patent Literature 2 is "An isotropic optical response of optically opaque elastomers with conductive fillers as revealed by terahertz polarization spectroscopy" Scientific Reports 6 39079 (2016). Non-Patent Literature 1 discloses a method for inspecting orientation of a polymer resin by using a diffraction pattern with X-ray irradiation. Non-Patent Literature 2 discloses a method for evaluating orientation of black carbon fillers contained in a rubber material on the basis of refractive index information obtained by irradiation of a terahertz wave.

SUMMARY

In the method disclosed in Non-Patent Literature 1, there is a concern that a resin may deteriorate due to irradiation with X-rays. In addition, there is a problem that handling of X-rays is not easy from the viewpoint of safety and complexity of management. In addition, in the method disclosed in Non-Patent Literature 2, the orientation of the filler is inspected, but the orientation of the polymer resin is not inspected.

The present disclosure has been made to solve the above-described problem and an object thereof is to provide a polymer resin orientation evaluation method capable of nondestructively inspecting orientation of a polymer resin by using a terahertz wave that is easy to handle.

According to an aspect of the present disclosure, there is provided a polymer resin orientation evaluation method including: setting an axis intersecting a front surface of an object to be inspected as an inspection axis, and acquiring an optical characteristic value of the object to be inspected with respect to a plurality of polarization directions of a terahertz wave around the inspection axis; and evaluating orientation of a polymer resin that constitutes the object to be inspected on the basis of a variation amount of the optical characteristic value with respect to change of the polarization direction.

In the orientation evaluation method, the polarization direction is changed around the inspection axis with respect to the front surface of the object to be inspected, and the optical characteristic value of the object to be inspected with respect to the plurality of polarization direction is acquired. The variation amount of the optical characteristic value of the object to be inspected with respect to the change of the polarization direction of the terahertz wave depends on the orientation of the polymer resin that constitutes the object to be inspected. Accordingly, it is possible to evaluate the orientation of the polymer resin that constitutes the object to be inspected by obtaining the variation amount of the optical characteristic value with respect to the change of the polarization direction from the optical characteristic value that is obtained. In the orientation evaluation method, it is possible to nondestructively inspect the orientation of the polymer resin by using the terahertz wave that is easier to handle in comparison to X-rays.

In the orientation evaluation method, the variation amount of the optical characteristic value may be compared with a threshold value that is determined in advance, and existence and non-existence of the orientation of the polymer resin that constitutes the object to be inspected may be evaluated on the basis of a comparison result. In this case, it is possible to evaluate existence and non-existence of the orientation with accuracy by the comparison with the threshold value.

In the orientation evaluation method, an absorption coefficient of the object to be inspected with respect to the terahertz wave may be used as the optical characteristic value. A variation amount of the absorption coefficient of the object to be inspected with respect to the change of the polarization direction of the terahertz wave greatly depends on the orientation of the polymer resin that constitutes the object to be inspected. Accordingly, when the absorption coefficient is used as the optical characteristic value, it is possible to perform orientation evaluation with more accuracy.

In the orientation evaluation method, reflection intensity of the object to be inspected with respect to the terahertz wave may be used as the optical characteristic value. A variation amount of the reflection intensity of the object to be inspected with respect to the change of the polarization direction of the terahertz wave greatly depends on the orientation of the polymer resin that constitutes the object to be inspected. Accordingly, when the reflection intensity is used as the optical characteristic value, it is possible to perform the orientation evaluation with more accuracy.

BRIEF DESCRIPTION OF THE DRAWINGS

FIG. 6A is a graph showing another example of the polymer resin orientation evaluation.

FIG. 6B is a graph showing the other example of the polymer resin orientation evaluation.

DETAILED DESCRIPTION

Hereinafter, a preferred embodiment of a polymer resin orientation evaluation method according to an aspect of the present disclosure will be described in detail with reference to the accompanying drawings.

Figure 1:
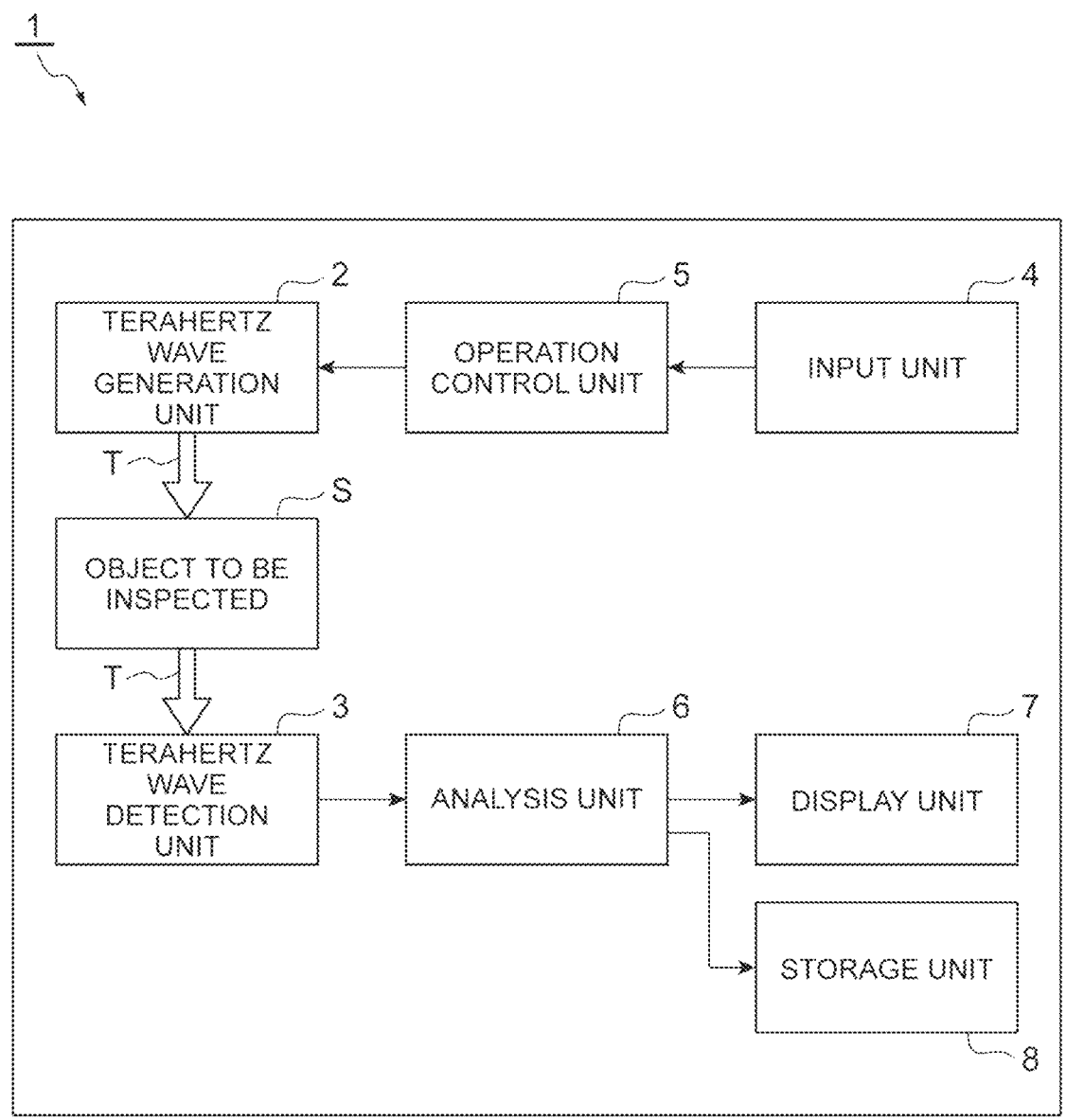
FIG. 1 is a block diagram illustrating an example of an inspection device to which a polymer resin orientation evaluation method is applied.

FIG. 1 is a block diagram illustrating an example of an inspection device to which the polymer resin orientation evaluation method is applied. An inspection device 1 illustrated in the same drawing is constituted as a device that nondestructively evaluates orientation of a polymer resin that constitutes an object S to be inspected by using a terahertz wave T. In measurement of the terahertz wave T in the inspection device 1, a pump-probe type time domain spectroscopy using femtosecond laser is used.

Figure 2A:
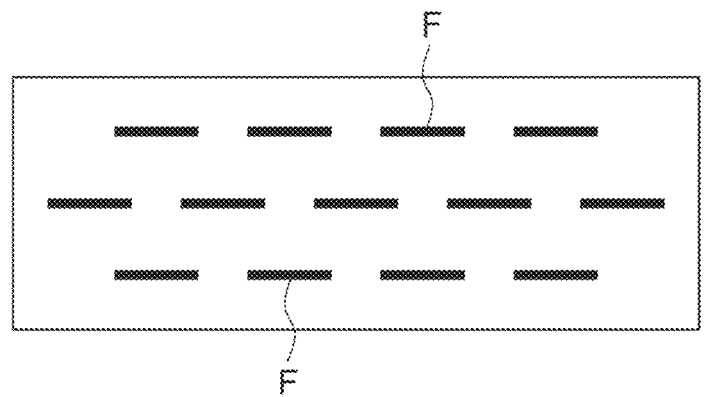
FIG. 2A is a schematic view illustrating orientation of the polymer resin in the case of injection molding.
Figure 2B:
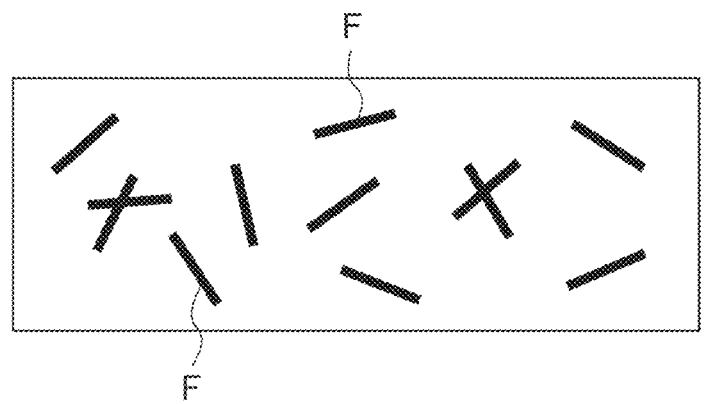
FIG. 2B is a schematic view illustrating orientation of the polymer resin in the case of extrusion molding.

The object S to be inspected is, for example, a resin product including a polymer resin such as a rubber tire. For example, the polymer resin is a crystalline resin. Examples of a resin material include polypropylene (PP). The polymer resin may be composed of a signal organic resin, or may be a composite material in which an inorganic filler is contained in an organic resin. Orientation of a polymer resin in the object S to be inspected is different depending on, for example, a resin molding method. For example, in injection molding, a polymer resin is caused to flow in a mold at a high pressure. According to this, as illustrated in FIG. 2A, a direction of a molecule chain F is aligned to a flow direction, and orientation of the polymer resin tends to be high. On the other hand, in extrusion molding, a flow speed of the polymer resin is slower in comparison to the injection molding. According to this, as illustrated in FIG. 2B, a direction of the molecule chain F becomes random, and the orientation of the polymer resin tends to be low.

Typically, in the injection molding in which the orientation of the polymer resin is high, tensile strength of a resin product that is obtained tends to be high, and in the extrusion molding in which the orientation of the polymer resin is low, the tensile strength of a resin product that is obtained tends to be low. In addition, in the extrusion molding, solidification of a resin proceeds slowly, and thus the degree of crystallization is likely to be high. According to this, there is a tendency that the rigidity and the strength of the resin product that is obtained increase, and toughness decreases. Accordingly, when evaluating the orientation of the polymer resin in the object S to be inspected by using the inspection device 1, it is possible to evaluate mechanical properties of the object S to be inspected.

Hereinafter, respective constituent elements of the inspection device 1 will be described. As illustrated in FIG. 1, the inspection device 1 includes a terahertz wave generation unit 2 and a terahertz wave detection unit 3. In addition, the inspection device 1 includes a input unit 4, an operation control unit 5, an analysis unit 6, a display unit 7, and a storage unit 8.

The terahertz wave generation unit 2 is a portion that generates a terahertz wave T. For example, the terahertz wave generation unit 2 includes a light source that outputs femtosecond pulse laser, a beam splitter that splits the femtosecond pulse laser into pump light and probe light, a nonlinear optical crystal or photoconductive antenna that pulse-outputs a linearly polarized terahertz wave by irradiation of the pump light. In addition, the terahertz wave generation unit 2 includes a delay stage that adjusts detection timing of the terahertz wave T in the terahertz wave detection unit 3.

Figure 3:
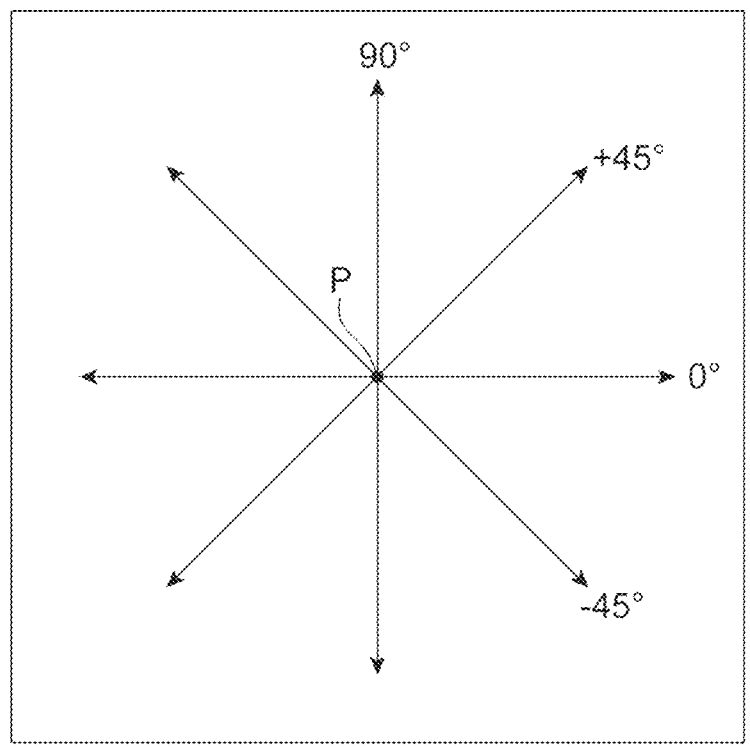
FIG. 3 is a view illustrating a relationship between an inspection axis and a polarization direction of a terahertz wave.

For example, the linearly polarized terahertz wave T is emitted from the terahertz wave generation unit 2 toward the object S to be inspected. As illustrated in FIG. 3, a polarization direction of the linearly polarized terahertz wave T is set to be rotatable around an axis (hereinafter, referred to as "inspection axis P") that intersects a front surface of the object S to be inspected. In FIG. 3, a linearly polarized terahertz wave T of which a polarization direction is 0°, 90°, ±45° is exemplified. The direction of 0° may be an arbitrary direction of the front surface of the object S to be inspected. The polarization direction of the terahertz wave T around the inspection axis P may be adjusted by a wavelength plate provided on the terahertz wave generation unit 2 side, or may be adjusted by rotating a stage on which the object S to be inspected is placed around the inspection axis P. For example, in a case where the front surface of the object S to be inspected is a flat surface, it is preferable that the inspection axis P conforms to a normal line of the flat surface. In addition, for example, in a case where the front surface of the object S to be inspected is a curved surface, it is preferable that the inspection axis P conforms to a normal line of a tangent plane of the curved surface.

The terahertz wave detection unit 3 is a portion that detects the terahertz wave T that is transmitted through the object S to be inspected. The terahertz wave detection unit 3 includes a detector such as an electro-optical crystal and a photoconductive antenna. In addition, the terahertz wave detection unit 3 includes a photodiode, an amplifier, and the like. The terahertz wave detection unit 3 acquires information of the terahertz wave T transmitted through the object S to be inspected for each of a plurality of polarization directions. For example, in the case of using electro-optical crystal, in a case where the terahertz wave T transmitted through the object S to be inspected, and probe light are simultaneously incident to the terahertz wave detection unit 3, the probe light undergoes birefringence due to the Pockels effect. A birefringence amount of the probe light is proportional to electric field strength of the terahertz wave T. The electric field strength of the terahertz wave T can be detected by detecting the birefringence amount of the probe light. The terahertz wave detection unit 3 outputs a signal corresponding to the detection result to the analysis unit 6.

For example, the input unit 4, the operation control unit 5, the display unit 7, the storage unit 8, and the analysis unit 6 are constituted by a computer system including a CPU, a memory, and the like. Examples of the input unit 4 include a keyboard, a mouse, a touch panel sensor, and the like. The input unit 4 receives an input of inspection initiation, various measurement conditions including the thickness of the object S to be inspected, and the like. The operation control unit 5 controls an operation of a light source or a delay stage. The display unit 7 displays an analysis result by the analysis unit 6. The storage unit 8 stores the analysis result obtained by the analysis unit 6.

For example, the analysis unit 6 analyzes a detection result of the terahertz wave T on the basis of a dedicated analysis program of the inspection device 1. The analysis unit 6 calculates optical characteristic value of the object S to be inspected with respect to a plurality of polarization directions of the terahertz wave T around the inspection axis P on the basis of a signal received from the terahertz wave detection unit 3. In addition, the analysis unit 6 evaluates orientation of the polymer resin that constitutes the object S to be inspected on the basis of a variation amount of the optical characteristic value with respect to change of the polarization directions.

Figure 4:
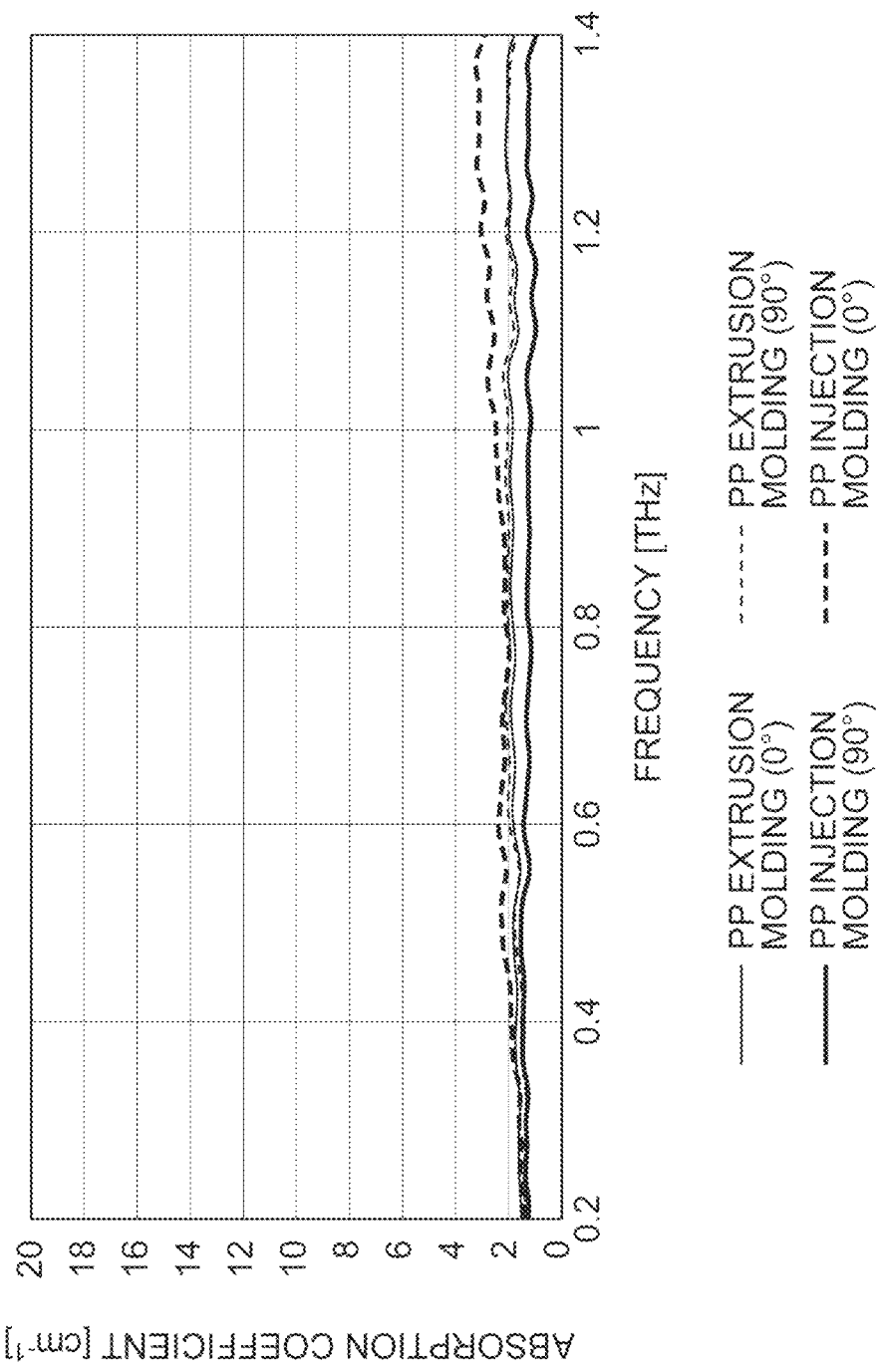
FIG. 4 is a graph showing an example of polymer resin orientation evaluation.

FIG. 4 is a graph showing an example of polymer resin orientation evaluation. The example in FIG. 4 shows results obtained by calculating optical characteristic values when a polarization direction of a terahertz wave is set to 0° and 90° with respect to an object to be inspected which is formed by injection molding and an object to be inspected which is formed by extrusion molding. A resin material is polypropylene. An optical characteristic value used in polymer resin orientation evaluation is an absorption coefficient. In FIG. 4, the horizontal axis represents a frequency, and the vertical axis represents the absorption coefficient.

As shown in FIG. 4, in the object to be inspected which is formed by injection molding, an absorption coefficient in a case where the polarization direction is 0° is higher than an absorption coefficient in a case where the polarization direction is 90°. Accordingly, it can be seen that the absorption coefficient of the object to be inspected which is formed by the injection molding has dependency with respect to the polarization direction of the terahertz wave. Note that, in the object to be inspected which is formed by the injection molding, a difference between the absorption coefficient in a case where the polarization direction is 90° and the absorption coefficient in a case where the polarization direction is 0° increases as the frequency of the terahertz wave increases.

On the other hand, in the object to be inspected which is formed by the extrusion molding, the absorption coefficient in a case where the polarization direction is 90° and the absorption coefficient in a case where the polarization direction is 0° approximately match each other. Accordingly, it can be seen that the absorption coefficient of the object to be inspected which is formed by the extrusion molding does not have dependency with respect to the polarization direction of the terahertz wave. Note that, the absorption coefficient of the object to be inspected which is formed by the extrusion molding becomes a value between the absorption coefficient in a case where the polarization direction is 90° and the absorption coefficient in a case where the polarization direction is 0° in the object to be inspected which is formed by the injection molding.

From the results shown in FIG. 4, it can be seen that it is possible to evaluate orientation of a polymer resin that constitutes the object S to be inspected by setting a threshold value with respect to a variation amount of the absorption coefficient with respect to change of the polarization direction, and by comparing the variation amount of the absorption coefficient and the threshold value. The analysis unit 6 retains the threshold value determined in advance and determines that orientation exists in the polymer resin that constitutes the object S to be inspected in a case where the variation amount of the absorption coefficient with respect to the change of the polarization direction exceeds the threshold value. On the other hand, in a case where the variation amount of the absorption coefficient with respect to the change of the polarization direction is equal to or less than the threshold value, the analysis unit 6 determines that the orientation does not exist in the polymer resin that constitutes the object S to be inspected.

For example, the analysis unit 6 may store a plurality of threshold values in correspondence with the kind or the thickness of the resin material that constitutes the object S to be inspected. In this case, for example, a threshold value that is used in the analysis unit 6 may be appropriately changed in correspondence with various measurement conditions input to the inspection device 1 by the input unit 4.

Figure 5:
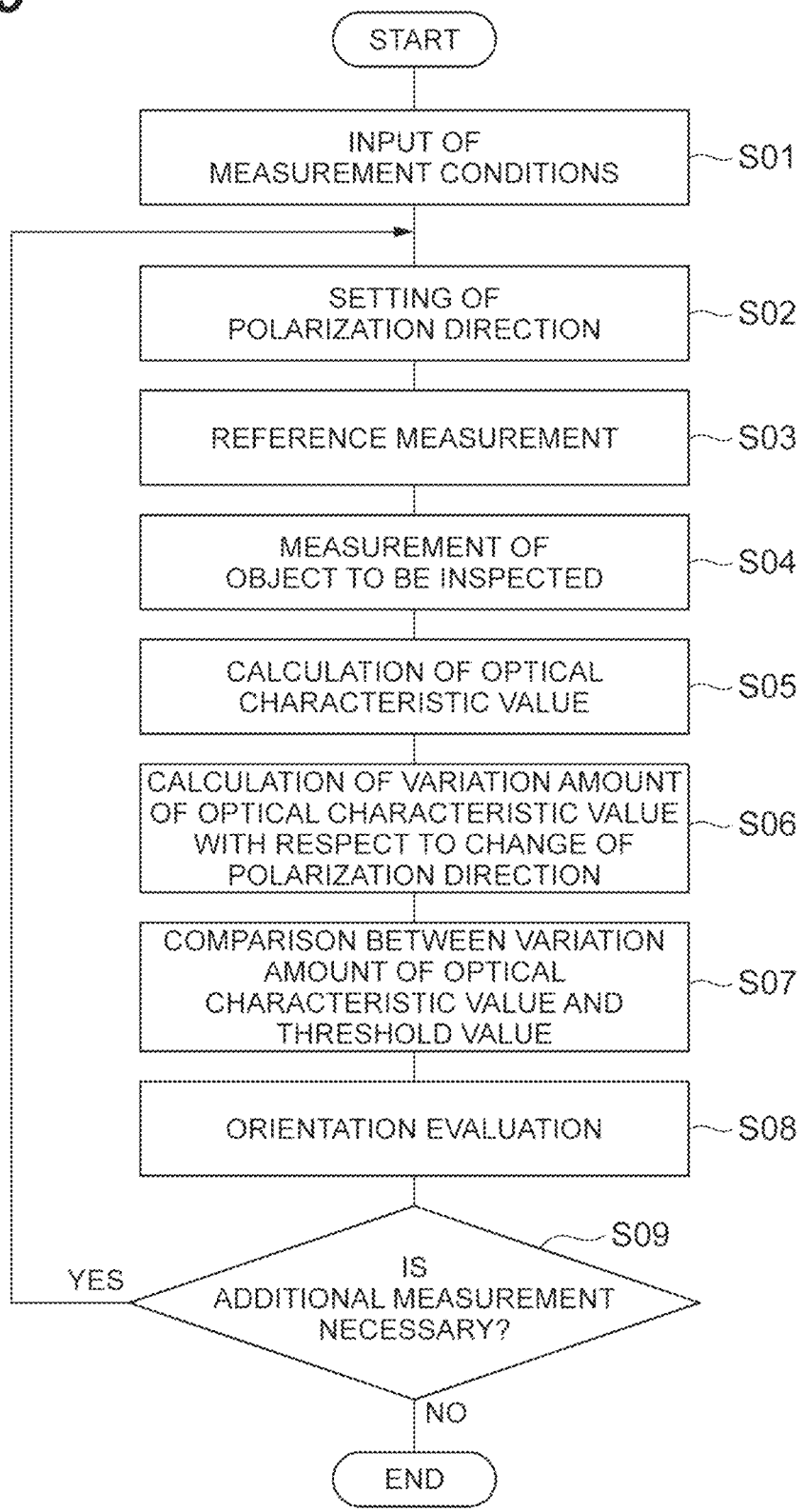
FIG. 5 is a flowchart illustrating the example of the orientation evaluation method.

FIG. 5 is a flowchart illustrating an example of an orientation evaluation method. As illustrated in the same drawing, in the orientation evaluation method, first, input of measurement conditions such as the thickness of the object S to be inspected is performed (step S01). After the input of the measurement conditions, setting of a threshold value that is used in the analysis unit 6 is performed. After the input of the measurement conditions, setting of the polarization direction of the terahertz wave T is performed (step S02). In initial setting, for example, the polarization direction of the terahertz wave T is set to two directions of 0° and 90°.

After setting the polarization direction, reference measurement is performed (step S03). In the reference measurement, in a state in which the object S to be inspected is not disposed, output and detection of the terahertz wave T in which the polarization direction is 0° and 90° are performed to acquire information of the terahertz wave T. Next, measurement of the object S to be inspected is performed (step S04). In the reference measurement, in a state in which the object S to be inspected is disposed, output and detection of the terahertz wave T of 0° and 90° are performed to acquire information of the terahertz wave T.

After performing the measurement of the object S to be inspected, an optical characteristic value of the object S to be inspected is calculated for every polarization direction on the basis of the detection result of the terahertz wave T (step S05). In addition, a variation amount of the optical characteristic value with respect to change of the polarization direction is calculated (step S06). Next, comparison between the variation amount of the optical characteristic value and the threshold value with respect to the change of the polarization direction is performed (step S07) to evaluate orientation of the polymer resin that constitutes the object S to be inspected (step S08). In a case where the variation amount of the optical characteristic value exceeds the threshold value, it is determined that the orientation of the polymer resin that constitutes the object S to be inspected exists. On the other hand, in a case where the variation amount of the optical characteristic value is equal to or less than the threshold value, it is determined that the orientation of the polymer resin that constitutes the object S to be inspected does not exist.

After the evaluation of the orientation, a determination as to whether or not additional measurement is necessary may be made (step S09). For example, in step S08, in a case where the variation amount of the optical characteristic value exceeds the threshold value, it is determined that additional measurement is not necessary, and the measurement is terminated. On the other hand, in step S08, in a case where the variation amount of the optical characteristic value is equal to or less than the threshold value, it is determined that additional measurement is necessary, and the determination that the orientation of the polymer resin that constitutes the object S to be inspected does not exist is left once, and it returns to step S02.

In additional step S02, the polarization direction of the terahertz wave T is set to a direction different from the initial setting (for example, +45° and −45°). Then, processing from step S03 to step S08 is performed again by using the terahertz wave T of the polarization direction that is newly set. In additional step S03, final evaluation is performed with respect to the orientation of the polymer resin on the basis of the comparison result between the variation amount of the optical characteristic value and the threshold value with respect to the change of the polarization direction. That is, in a case where the variation amount of the optical characteristic value exceeds the threshold value, it is determined that the orientation of the polymer resin that constitutes the object S to be inspected exists. On the other hand, in a case where the variation amount of the optical characteristic value is equal to or less than the threshold value, it is determined that the orientation of the polymer resin that constitutes the object S to be inspected does not exist.

As described above, in the orientation evaluation method, the polarization direction is changed around the inspection axis P with respect to a front surface of the object S to be inspected, and the optical characteristic value of the object S to be inspected with respect to the plurality of polarization directions is acquired. As shown in FIG. 4, the variation amount of the optical characteristic value of the object S to be inspected with respect to the change of the polarization direction of the terahertz wave T depends on the orientation of the polymer resin that constitutes the object S to be inspected. Accordingly, it is possible to evaluate the orientation of the polymer resin that constitutes the object S to be inspected by obtaining the variation amount of the optical characteristic value with respect to change of the polarization direction from the optical characteristic value that is obtained. In the orientation evaluation method, it is possible to nondestructively inspect the orientation of the polymer resin by using the terahertz wave T that is easier to handle in comparison to X-rays.

In addition, in the orientation evaluation method, the variation amount of the optical characteristic value is compared with the threshold value determined in advance, and existence and non-existence of the orientation of the polymer resin that constitutes the object S to be inspected is evaluated on the basis of the comparison result. In this case, it is possible to evaluate existence and non-existence of the orientation with accuracy through comparison with the threshold value determined in advance.

In addition, in the orientation evaluation method, the absorption coefficient of the object S to be inspected with respect to the terahertz wave T is used as the optical characteristic value. The variation amount of the absorption coefficient of the object S to be inspected with respect to change of the polarization direction of the terahertz wave T greatly depends on the orientation of the polymer resin that constitutes the object S to be inspected. Accordingly, when the absorption coefficient is used as the optical characteristic value, it is possible to perform the orientation evaluation with more accuracy.

This embodiment includes another aspect in which additional measurement is performed in a case where the variation amount of the optical characteristic value in the polarization direction determined in the initial setting is equal to or less than the threshold value. In the additional measurement, the variation amount of the optical characteristic value of the object S to be inspected is acquired again by using the terahertz wave T of the polarization direction, and a final evaluation relating to the orientation of the polymer resin is performed. In accordance with the degree of the orientation of the polymer resin, dependency on the optical characteristic value of the object S to be inspected with respect to the polarization direction determined in the initial setting may be small. Accordingly, when performing the additional measurement is performed by using the terahertz wave T of another polarization direction, it is possible to perform the orientation evaluation with more accuracy. Note that, the number of times of additional measurement is not limited to one time and may be two or more times. In addition, it is not necessary to perform the additional measurement, and the additional measurement may be omitted.

The present disclosure is not limited to the above-described embodiment. For example, in the above-described embodiment, polypropylene is exemplified as the resin material, but other resin materials such as polyacetal (POM) may be applied. FIG. 6A and FIG. 6B show results obtained by calculating absorption coefficients when polyacetal is set as the resin material, and the polarization direction of the terahertz wave is set to 0° and 90°, respectively. FIG. 6A shows a result with respect to an object to be inspected which is formed by injection molding, and FIG. 6B shows a result with respect to an object to be inspected which is formed by extrusion molding.

From the results shown in FIG. 6A and FIG. 6B, it can be seen that the absorption coefficient of the object to be inspected which is formed by injection molding has dependency on the polarization direction of the terahertz wave even in a case where the resin material is polyacetal. In addition, it can be seen that the absorption coefficient of the object to be inspected which is formed by the extrusion molding does not have dependency on the polarization direction of the terahertz wave. Accordingly, even in a case where the resin material is polyacetal, it can be understood that it is possible to evaluate the orientation of the polymer resin that constitutes the object to be inspected by setting a threshold value with respect to the variation amount of the absorption coefficient with respect to change of the polarization direction, and by comparing the variation amount of the absorption coefficient and the threshold value.

In addition, in the inspection device 1, an aspect in which the terahertz wave T is transmitted through the object S to be inspected, and measurement of the absorption coefficient is performed is exemplified, but it is possible to employ an aspect in which the absorption coefficient is measured by using the terahertz wave T reflected from a front surface or a rear surface of the object S to be inspected. Even in the reflection-type measurement, it is possible to evaluate the orientation of the polymer resin by the same method as in the transmission-type measurement. In addition, in the case of application of the reflection-type measurement, when accommodating the terahertz wave generation unit 2 and the terahertz wave detection unit 3 in a small-sized housing, it is possible to constitute the inspection device 1 that constitutes a handy-type inspection device 1 that can be carried with one hand.

In the configuration, as the light source included in the terahertz wave generation unit 2, for example, a quantum cascade laser can be used. In addition, in the configuration, as a detector included in the terahertz wave detection unit 3, for example, a Schottky barrier diode can be used. In this case, the measurement by the inspection device 1 becomes measurement of reflection intensity of the terahertz wave T instead of measurement of the absorption coefficient by using time domain spectroscopy. In a case where the polymer resin that constitutes the object S to be inspected has orientation, as described above, the absorption coefficient of the object to be inspected has dependency on the polarization direction of the terahertz wave T. According to this, reflection intensity of the terahertz wave T that is detected by the terahertz wave detection unit 3 has dependency on the polarization direction of the terahertz wave T. Accordingly, even in the case of using the reflection intensity as the optical characteristic value, it is possible to perform the orientation evaluation with more accuracy.

Figure 7:
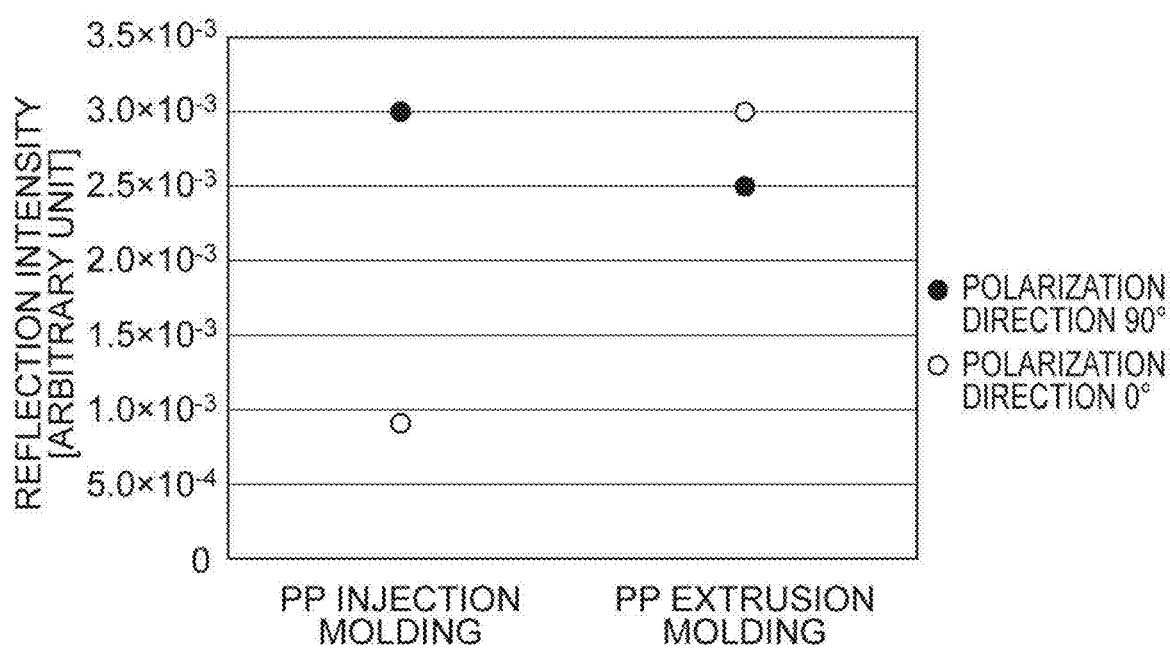
FIG. 7 is a graph showing still another example of the polymer resin orientation evaluation.
Figure 8:
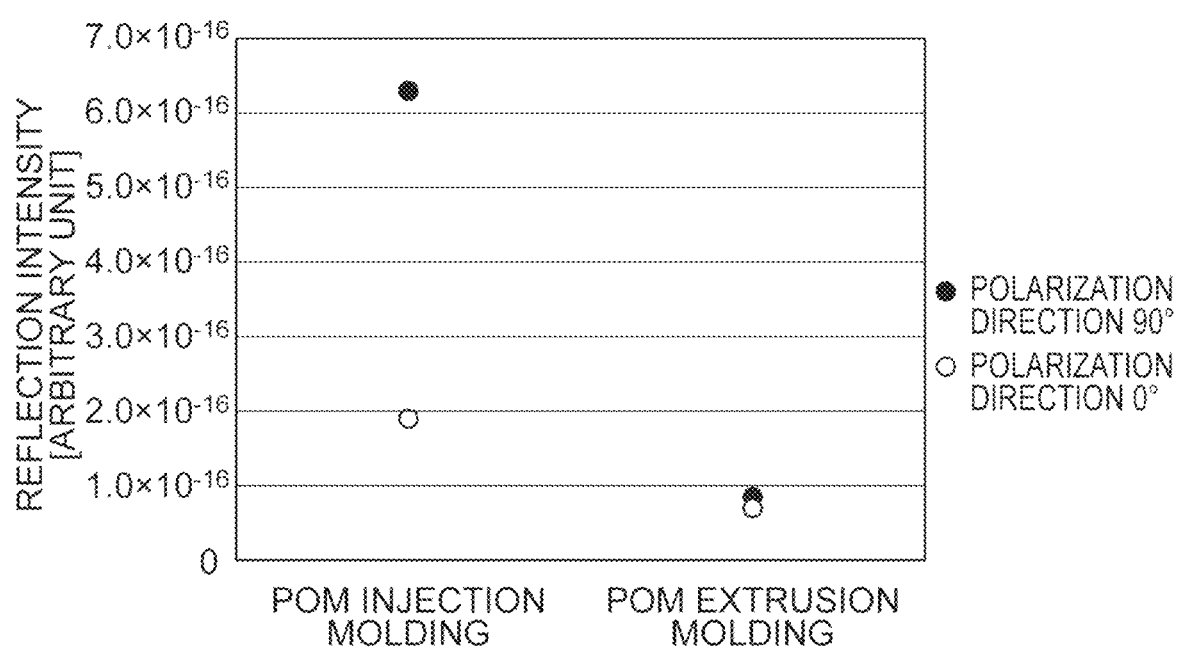
FIG. 8 is a graph showing still another example of the polymer resin orientation evaluation.

FIG. 7 shows results obtained by calculating reflection intensities when polypropylene is set as the resin material, and the polarization direction of the terahertz wave is set to 0° and 90°, respectively. In addition, FIG. 8 shows results obtained by calculating reflection intensities when polyacetal is set as the resin material, and the polarization direction of the terahertz wave is set to 0° and 90°, respectively. Here, the thickness of the object to be inspected was set as 1 cm, and a terahertz wave that is emitted to the object to be inspected was set to monochromatic light having a frequency of 1.5 THz. The reflection intensity was calculated on the basis of the thickness (reciprocal thickness) of the object to be inspected and a value of the absorption coefficient. In the calculation, an influence by Fresnel reflection on a front surface and a rear surface of the object to be inspected was ignored.

From the results shown in FIG. 7 and FIG. 8, it can be seen that the reflection intensity of the object to be inspected which is formed by injection molding has dependency on the polarization direction of the terahertz wave even in a case where the resin material is either polypropylene or polyacetal. In addition, it can be seen that the reflection intensity of the object to be inspected which is formed by extrusion molding does not have dependency on the polarization direction of the terahertz wave. Accordingly, it can be seen that it is possible to evaluate orientation of a polymer resin that constitutes an object to be inspected in a similar manner as in the case of using the absorption coefficient by setting a threshold value with respect to a variation amount of the reflection intensity with respect to change of the polarization direction, and by comparing the variation amount of the reflection intensity and the threshold value.

Figure 9:
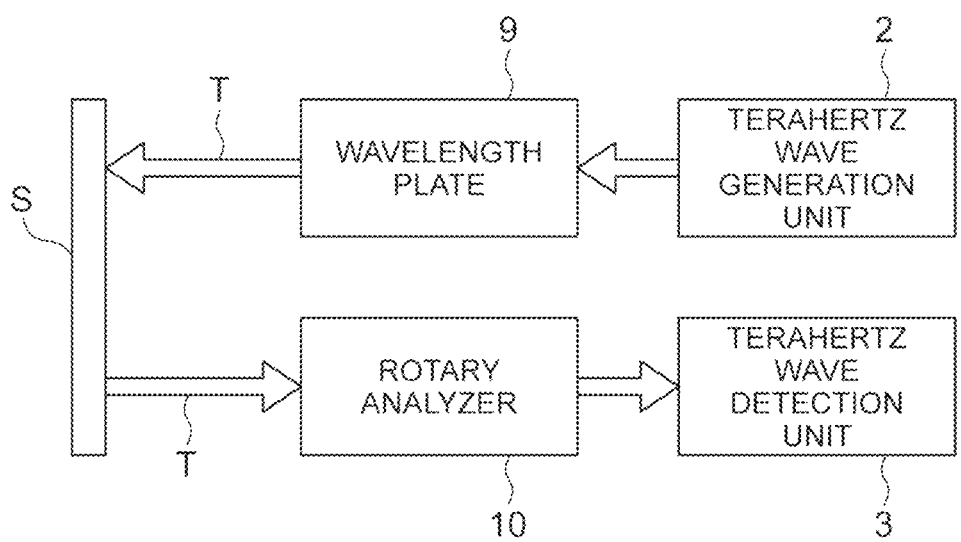
FIG. 9 is a block diagram illustrating a main portion of a modification example of the inspection device.

In addition, in the above-described inspection device 1, the polarization direction of the linearly polarized terahertz wave T is rotated around the inspection axis P with respect to the front surface of object S to be inspected, but an aspect of acquiring the optical characteristic value of the object S to be inspected with respect to the polarization direction of the terahertz wave T is not limited thereto. For example, as illustrated in FIG. 9, a polarization state of the terahertz wave T emitted from the terahertz wave generation unit 2 may be converted from linearly polarized light into circularly polarized light by a wavelength plate 9, and the terahertz wave T reflected from the object S to be inspected may be allowed to pass through a rotary analyzer 10 to be detected by the terahertz wave detection unit 3. In this case, since the optical characteristic value of the object S to be inspected with respect to the polarization direction of the terahertz wave T can be obtained through rotation of the rotary analyzer 10, simplification of a device configuration is realized.

In the configuration, as the light source included in the terahertz wave generation unit 2, for example, a quantum cascade laser, IMPAct-ionization Time Transit Diode (IMPATT diode), a resonance tunnel diode, or the like can be used. In addition, in the configuration, as the detector included in the terahertz wave detection unit 3, for example, a Schottky barrier diode, a pyro detector, a Golay cell detector, a resonance type detector, or the like can be used.

P: inspection axis, S: object to be inspected, T: terahertz wave.

What is claimed is:

1. A polymer resin orientation evaluation method, comprising:
    setting an axis intersecting a front surface of an object to be inspected as an inspection axis, and acquiring an optical characteristic value of the object to be inspected with respect to a plurality of polarization directions of a terahertz wave around the inspection axis; and
    evaluating orientation of a polymer resin that constitutes the object to be inspected on the basis of a variation amount of the optical characteristic value with respect to change of the polarization direction.

2. The polymer resin orientation evaluation method according to claim 1,
    wherein the variation amount of the optical characteristic value is compared with a threshold value that is determined in advance, and existence and non-existence of the orientation of the polymer resin that constitutes the object to be inspected is evaluated on the basis of a comparison result.

3. The polymer resin orientation evaluation method according to claim 2,
    wherein an absorption coefficient of the object to be inspected with respect to the terahertz wave is used as the optical characteristic value.

4. The polymer resin orientation evaluation method according to claim 2,
    wherein reflection intensity of the object to be inspected with respect to the terahertz wave is used as the optical characteristic value.

5. The polymer resin orientation evaluation method according to claim 1,
    wherein an absorption coefficient of the object to be inspected with respect to the terahertz wave is used as the optical characteristic value.

6. The polymer resin orientation evaluation method according to claim 1,
    wherein reflection intensity of the object to be inspected with respect to the terahertz wave is used as the optical characteristic value.

* * * * *